(12) United States Patent
Komano et al.

(10) Patent No.: US 6,792,938 B2
(45) Date of Patent: Sep. 21, 2004

(54) AIR TYPE SOLAR SYSTEM

(75) Inventors: Seiji Komano, Hamamatsu (JP); Koji Suzuki, Hamamatsu (JP)

(73) Assignees: Kabushiki Kaisha Ohem Kenkyujo, Tokyo (JP); Kabushiki Kaisha Ohem Sora Kyokai, Shizuoka (JP)

(*) Notice: Subject to any disclaimer, the term of this patent is extended or adjusted under 35 U.S.C. 154(b) by 0 days.

(21) Appl. No.: 10/364,989

(22) Filed: Feb. 12, 2003

(65) Prior Publication Data

US 2004/0154615 A1 Aug. 12, 2004

(51) Int. Cl.$^7$ .................................................. F24J 2/40
(52) U.S. Cl. ........................ 126/597; 126/596; 126/629; 126/633
(58) Field of Search ................................ 126/623, 583, 126/622, 596, 621, 633, 704, 629, 594, 632, 597; 136/248, 251, 291

(56) References Cited

U.S. PATENT DOCUMENTS

| | | | | |
|---|---|---|---|---|
| 4,244,519 A | * | 1/1981 | Zornig et al. | 126/591 |
| 4,967,729 A | * | 11/1990 | Okumura | 126/632 |
| 5,849,107 A | * | 12/1998 | Itoyama et al. | 136/248 |
| 2002/0074034 A1 | * | 6/2002 | Fujisaki et al. | 136/246 |

FOREIGN PATENT DOCUMENTS

| | | | |
|---|---|---|---|
| JP | 7-217011 | * | 8/1995 |
| JP | 10-108385 | * | 4/1998 |

* cited by examiner

Primary Examiner—James C. Yeung
(74) Attorney, Agent, or Firm—Koda & Androlia

(57) ABSTRACT

An air type solar system of the present invention has a heat-collecting unit for heating air by solar heat, and a blower fan for blowing the air as a heat medium from the heat-collecting unit. The blower fan is of a large scale, which is capable of: blowing the air at a rate of about 100 to 2000 m$^3$/hour; and rotating by a direct-current generated from solar cells under normal conditions. In addition, the amount of airflow is confined by an automatic electrical control in winter to adjust the temperature of heat-collected air to an appropriate temperature for heating and humidification. Therefore, the air type solar system of the present invention can be appropriately operated in quest of an effective use of the solar cells while there is no need to use any storage cell. In addition, the air type solar system is capable of controlling the operation of the blower fan that receives electric power supplies mainly from the solar cells such that the temperature of heat-collected air is not too high in summer while it is adjusted within the desired, range in winter.

5 Claims, 21 Drawing Sheets

<a>

<b>

<c>

AIR TYPE SOLAR SYSTEM

BACKGROUND OF THE INVENTION

1. Field of the Invention

The present invention relates to an air type solar system that utilizes solar energy, where the air being heated by solar heat is provided as a heat source to heat air and water in a home or the like for heating, humidification, hot-water supply, and so on.

2. Description of the Related Art

Heretofore, technologies for utilizing solar heat have been studied and developed in the art. In the first half of 1980s shortly after the oil shocks, however, the technical developments were at their peaks. After that time, they are almost stagnant.

Among these technologies, water-heating type solar systems, which utilize solar heat, have been relatively used in common. However, they hardly attain performance goals such as anti-freeze, caulking, and increased useful life of durability.

Among them, on the hand, air-heating type solar systems are suited to be distributed over wide areas including cold regions because they are free of troubles such as freezing and water leakage. However, they consume more electric energies, which are comparatively expensive, and the volumetric specific heat of air is 0.3/1000. Therefore, a more volume of airflow should be supplied for collecting the desired amount of solar heat.

Furthermore, a solar system used for heating in a building has a disadvantage of being brought down at the time of power fails in disaster situations or the like. When a ventilation device is operated in some way even at the time of power failure to allow heat function, it will become possible to utilize a solar system in a disaster, refugee camps, and so on irrespective of nations and places.

Therefore, it has been desired to solve the problems in technical development for using heat from solar energy and enhancing the progress of such a technical development. In addition, it has been also desired to progress the technical development of self-sustaining operation of the solar system at the time of power fails.

In U.S. Pat. No. 5,849,107 (1998), for example, a solar system disclosed in JP-B-No. 48299/1991 is exemplified as one of the conventional technologies. In other words, the air-heating type solar system is presented for utilizing a clean energy source, in which solar heat is collected using the surface of a roof board and is then utilized for floor heating, hot-water supply, and the like.

In the system, as shown in FIG. 26, fresh air enters an air passage 3 formed on a roof plate 1 through an outside air inlet 2. The outside air inlet 2 is formed at the edge of eaves and rises naturally and gradually toward the ridge of a roof. The air passing through the air passage 3 becomes warmer by receiving solar heat radiated to the roof surface through the roof plate 1 provided as a heat-collecting metallic roof plate.

Then, the warm air is supplied to a space 6 formed under a floor via an air duct 5 by a blower fan 4, thereby to heat the entire space of a room 7. The air passage 3 and the air duct 5 are covered with a heat insulating material 8 in order to prevent heat from escaping.

In U.S. Pat. No. 5,849,107 (1998), therefore, there is proposed a method of using a solar cell, which is one of the existing clean energy sources, as a power source of the above system, where a solar cell module made up of a plurality of solar cells is used in place of a metallic heat-collecting plate on the roof.

Furthermore, such a heat collector using the conventional solar cell to be used in the above process of heating or humidification is mainly designed such that the solar cell is used in combination with a storage cell. In this case, the storage cell may be used for the power supply by converting the generated electricity to a solar cell into an alternating current power supply and the stabilization of power-supply voltage to directly use the solar cell as a power source. In addition, it may be used for the operation in darkness or at night without power generation from the solar cell or used as an auxiliary power supply with respect to a control power supply.

However, lead-containing storage cells generally used in large quantities are inferior in durability and contain substances that have adverse environmental effects. Therefore, the use of such storage cells should be avoided as far as possible.

Furthermore, for example, a method of switching to a storage cell provided as an auxiliary power-supplying device when the decrease in electric power generated from a solar cell is caused, a method of stabilizing the power using such an auxiliary power-supplying device, or the like requires a complicated configuration of building blocks. It may become difficult to use the electric power generated from the solar cell the most effectively.

For the collection of heat using a solar cell, on the other hand, a pump for transferring water is used in a water-type solar system and a fan for transferring air is used an air-type solar system. In these cases, however, there is no consideration given to an electrical control of the amount of flow, in particular completely none in small and domestic devices, because of the following reasons.

In a solar system such as a water-type solar system, a heat medium for heating circulates through a heat-collecting portion and a hermetically sealed heat-storage tank to perform a heat exchange. Therefore, the main reason is that an efficiency of collecting heat increases as the amount of flow being circulated increases, so that there is no need of flow control. In the air-type solar system, furthermore, there is no need of flow control just as in the case with the water-type one when the heat exchange is performed by circulating through a semi-hermetically sealed heat-storage tank using crushed stones or the like.

Another reason is that there is a blind spot in the generally considered air-flowing properties of pump or fun to be driven by a solar cell. The production of electricity from the solar cell is in proportion to the; amount of solar radiation, so that it is considered that a heat-collecting temperature may decrease as the airflow increases in summer, while the heat-correcting temperature may increase as the airflow decreases in winter. Such a blind spot may be depended on that the necessity of controlling the amount of flow in the conventional heat-collecting system as described above.

Regarding the actual power-generating properties of the solar cell, a substantial decrease in the amount of electricity production, especially the voltage of generated power is caused in summer. Therefore, the flow rate of air or water passing through the pump or fan, which is driven by the solar cell, is decreased in summer. In this case, furthermore, the temperature of heat-collected air can be extremely increased. Such a blind spot is generated because of the following reasons. That is, the performance of the solar cell is rated at a standard temperature of 25° C., so that there is a large difference between the maximum temperature of the solar cell and the standard temperature (25° C.) in summer (i.e., approximately 70 to 80° C.) while a small difference between the maximum temperature of the solar cell (i.e., approximately 10 to 40° C.) and the standard temperature (25° C.) in winter.

Generally, the solar system is required to provide a large quantity of airflow in summer and a small quantity of airflow in winter. However, the airflow properties of the fan to be simply driven by a solar cell are reversed from the desired airflow.

SUMMARY OF THE INVENTION

An object of the present invention is to provide an air type solar system having the advantages of: solving the above disadvantages of the conventional systems described above in quest of an effective use of solar cells and displacement of storage cells and obviating the need for storage cells; and appropriately controlling the operation of a blower fan that receives electric power supplies mainly from the solar cells such that the temperature of heat-collected air is not too high in summer while it is adjusted within the desired range in winter.

For attaining the above object, In a first gist of the present invention, there is provided an air type solar system, comprising: a heat-collecting unit for heating air by solar heat; and blower fan for blowing the air as a heat medium from the heat-collecting unit, wherein the blower fan is of a large scale, which is capable of: blowing the air at a rate of about 100 to 2000 $m^3$/hour; and rotating by a direct-current generated from solar cells under normal conditions, while the amount of airflow is confined by an automatic electrical control in winter to adjust the temperature of heat-collected air to an appropriate temperature for heating or humidification.

In a second gist of the present invention, the electrical control may be performed by detecting the temperature of heat-collected air by a temperature sensor, and generating an output signal of a degree of a proportional control to an integrated circuit of a fan-driving motor controller, where the degree of the proportional control is obtained from the difference between the temperature of heat-collected air and a target temperature to be attained by the CPU.

In a third gist of the present invention, a damper may be placed in an air passage through which the air is supplied from the blower fan, where the damper can be fixed in a predetermined state by a gear lock or the like even after powering off.

In a fourth gist of the present invention, the automatic electrical control is exercised by a control device having a nonvolatile memory that keeps the contents, the contents of matters detected by the temperature sensor, the determining status of the control, and so on.

In a fifth gist of the present invention, the solar cell is connected with an auxiliary power-supplying device via a rectifying device, where the auxiliary power-supplying device is adjusted to a voltage lower than an appropriate operating voltage thereof to be obtained by providing the solar cell as the power-supplying device, and a combination of the solar cell and the auxiliary power-supplying device is used as a power-supplying device.

In a sixth gist of the present invention, the heat-collecting unit for heating air by solar heat is mounted on a roof, a wall, or the like, and is communicated with a heat-collecting duct, while the heat-collecting duct is connected with a backflow-preventing dumper for preventing backflow of air to the heat-collecting duct, a passage-switching dumper for switching between an airflow to a vertical dumper for flowing the air into a room and an airflow to an exhaust duct for exhausting the air outside, and a handling box having a blower fan arranged between the backflow-preventing damper and the passage-switching damper, and the output side of the handling box is connected with the vertical duct for flowing the air into the room and the exhaust duct for exhausting the air outside.

According to the invention of claim 1, in the operation of the air type solar system, the electric power generated by solar cells is used as an electric power supply to increase the dependency on natural energy that can be recycled. Therefore, there is an advantage of ensuring the minimum heating conditions by its self-sustaining at a distant location, or in the event of a power failure or disaster, so that it can be useful to keep the safety of life and property from dangerous matters and deficiencies.

Next, the air type solar system of the present invention does not use any storage cell, so that the durability thereof can be increased. By the way, in the case of a system that uses a typical commercial power supply, especially one using an unstable power supply from solar cells or the like, a storage cell is generally mounted for storing a comparatively large amount of electric power to keep the operation of switching devices such as dumpers, settings of the operation, information about the control, the actuation of the blowing fan, and so on. However, such a system has many problems that should be solved. For instance, the lifetime of the storage cell such as a lead-acid battery is short. In addition, there is the need for control management on the charged voltage for preventing deterioration of the charging performance. Furthermore, there is another problem that the storage cell contains an environmentally toxic substance that cannot be discarded. According to the present invention, on the other hand, these problems can be solved.

Furthermore, according to the present invention, the air type solar system has the blower fan that mainly uses the power supplied from solar cells. Therefore, such a fan is able to appropriately adjust the airflow to a strong one in summer and a weak one in winter by means of electrical control. Therefore, the temperature of heat-collected air can be adjusted so as to be not too high in summer and to be corresponded with the desired temperature in winter.

In particular, in the case of the air type solar system having a heat-accumulating body which is comparatively free to the humidification target space or in the case of the system in the absence of such a heat-accumulating body, or in the case of the system by which the air is forced into the room such that the heated air is directly fed into the target space or the outside air is directly fed into the target space, the temperature of heat-collected air exerts a substantial influence upon the target space. Therefore, there is the need for adjusting the amount of airflow for adjusting the temperature of heat-collected air to the desired temperature, so that the control described above can be effective.

According to the invention, the air type solar system has another advantage of being preferable as an electric control in addition to the above advantageous actions.

According to the invention, the air type solar system is provided in combination with a damper having a gear-locking mechanism or the like to be fixed in a desired state even after powering off. Therefore, the dumper can be fixed in place without using any storage cell even though there is no electric power generated from the solar cells. Therefore, it becomes possible to prevent heat loss by an unexpected airflow and so on, allowing the control of operation suitable for self-sustaining.

According to the invention, the air type solar system can be controlled in an appropriate manner depending on circumstances by the use of a rewritable nonvolatile memory as a storage into which the contents of settings, the contents of detection by a temperature sensor, the contents of judgment by the controller, and so on. The information stored in the memory can be kept and rewritten without using any storage cell even after powering off.

According to the invention, the air type solar system is capable of supplying electric power, which can be generally used when the amount of solar radiation is small or when the system is operated in the night in general, by combining the power supply from the solar cells and the power supply from a commercially available power-supplying system.

Therefore, the solar cells are used in combination with an auxiliary power-supplying device being adjusted to a voltage lower than an operating voltage of the solar cells provided as the power source via a rectifying device. Almost the whole power generated from the solar cells is effectively used, while the auxiliary power-supplying device can be used in combination therewith to keep an appropriate voltage level. Therefore, the system can be operated with an acceptable amount of airflow in the night or darkness.

According to the invention, a solar system house can be realized.

DETAILED DESCRIPTION OF THE INVENTION

Hereinafter, preferred embodiments of the present invention will be described in detail with reference to the attached drawings.

Figure 1:
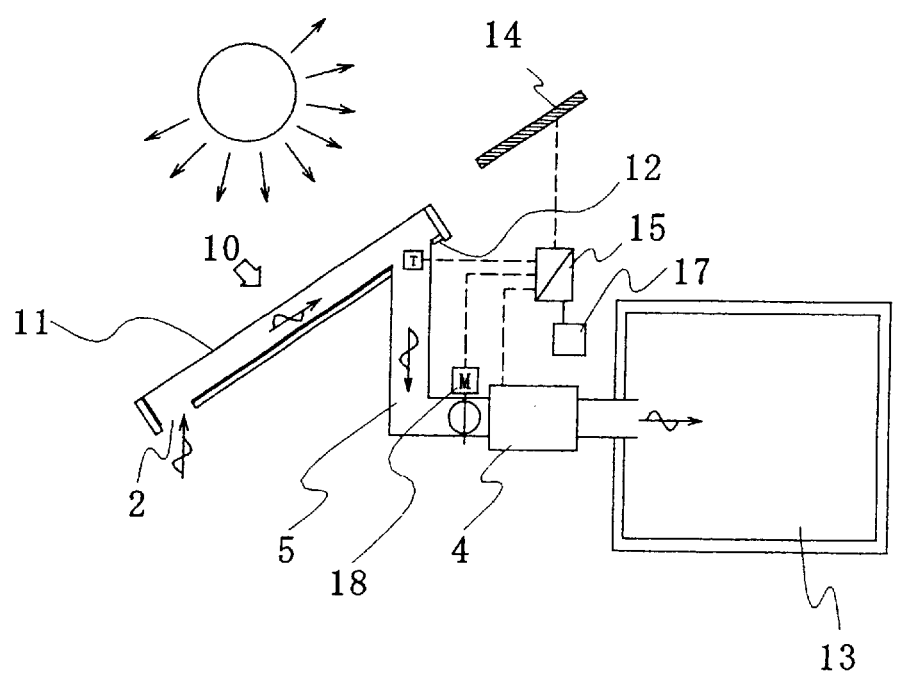
FIG. 1 is a schematic diagram for illustrating an air type solar system as a first embodiment of the present invention.
Figure 2:
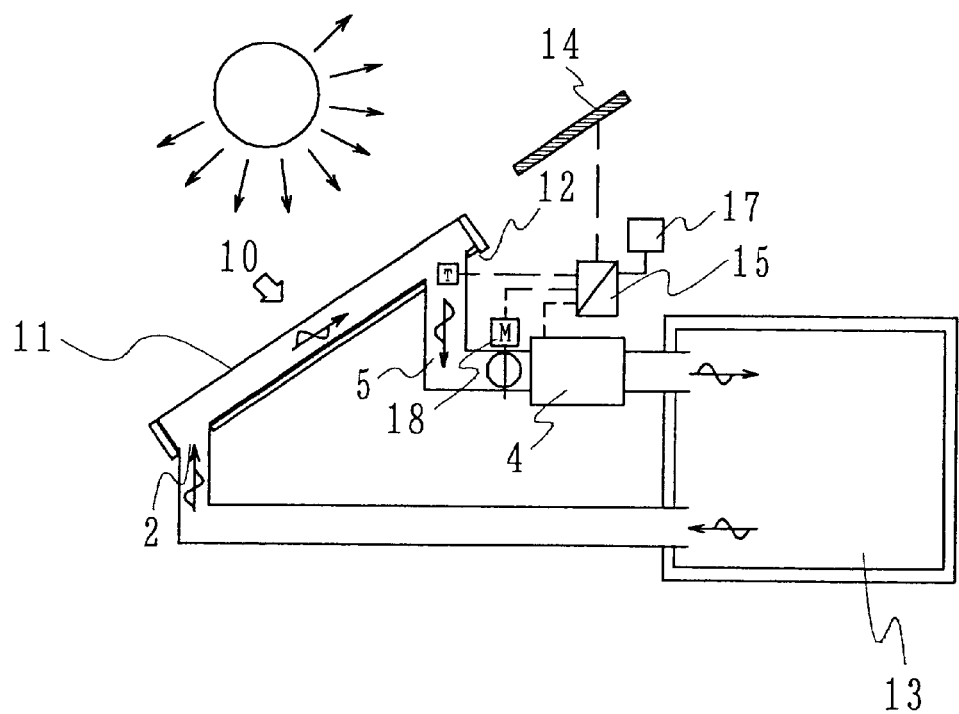
FIG. 2 is a schematic diagram for illustrating an air type solar system as a second embodiment of the present invention.

FIG. 1 is a schematic diagram for illustrating an air type solar system as a first preferred embodiment of the present invention. Also, FIG. 2 is a schematic diagram for illustrating an air type solar system as a second preferred embodiment of the present invention. In these figures, the reference numeral 10 denotes a heat-collecting unit.

In each of the figures, the heat-collecting unit 10 is composed of: a metallic roof plate 11 to be heated by solar heat or a transparent body (e.g., a combination of glass and metal plates, forming a heat-insulating air layer) that allows solar radiation to pass through the body; and an air passage 3 having an air inlet 2 on its one end. The heat-collecting unit 10 may be designed as a panel, a box, one built in a roof as described in the related art, or the like. In the case of the built-in type, as will be described latter, the metallic roof plate 11 is provided as a roof plate, so that air inlet 2 is formed at the edge of an eaves and the air passage 3 extends along the slope of the roof directly below the roof plate.

In addition to the heat-collecting unit 10, the solar system further comprises a blower fan 4 and an air duct 5. The air duct 5 makes a connection between an outlet 12 of the air passage 3 and a target space 13 where heat-collected air is used. In the middle of the air duct 5, the blower fan 4 is placed for blowing an air heat medium from the heat-collecting unit 10.

Furthermore, in the case of the second embodiment shown in FIG. 2, the air inlet 2 of the air passage 3 is connected with the target space 13 by a recovered air duct 24.

The blower fan 4 is constructed such that the volume of air supplied by the fan 4 can be in the range of about 100 to 2000 m$^3$/h and is driven by a direct-current power supply from a solar cell module 14 (a plurality of solar cells) equipped on the roof.

Referring again to FIGS. 1 and 2, the reference numeral 15 denotes a proportional control unit, which is responsible for controlling the amount of current passing through the blower fan 4 and a motor-driven damper 18 from the solar cell module 14 and is a micro computer 26 being connected with a temperature sensor 16 mounted on the air passage 3 or the air duct 5.

Figure 3:
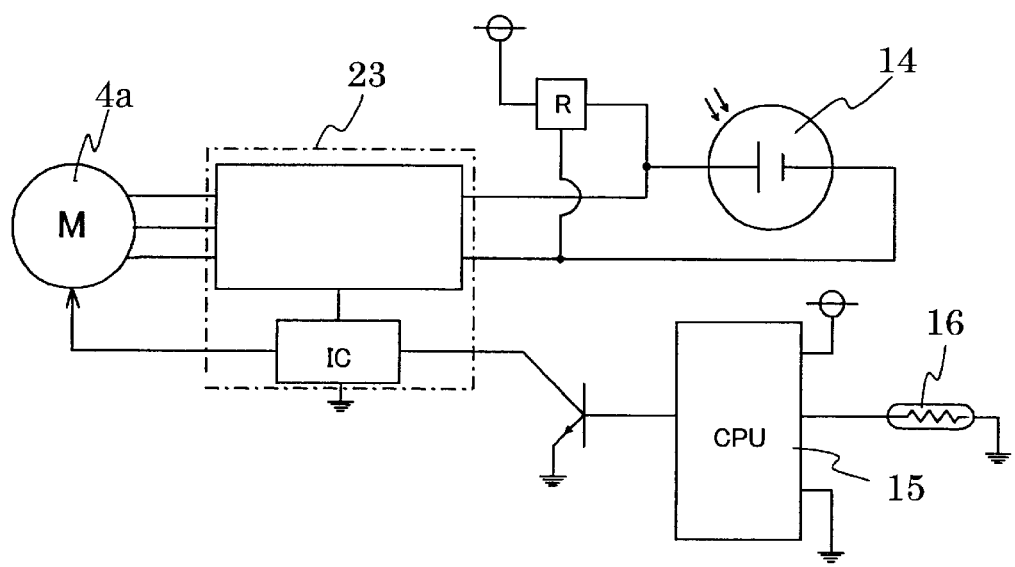
FIG. 3 is a control circuit diagram of a blower fan to be used in the air type solar system of the present invention.
Figure 8:
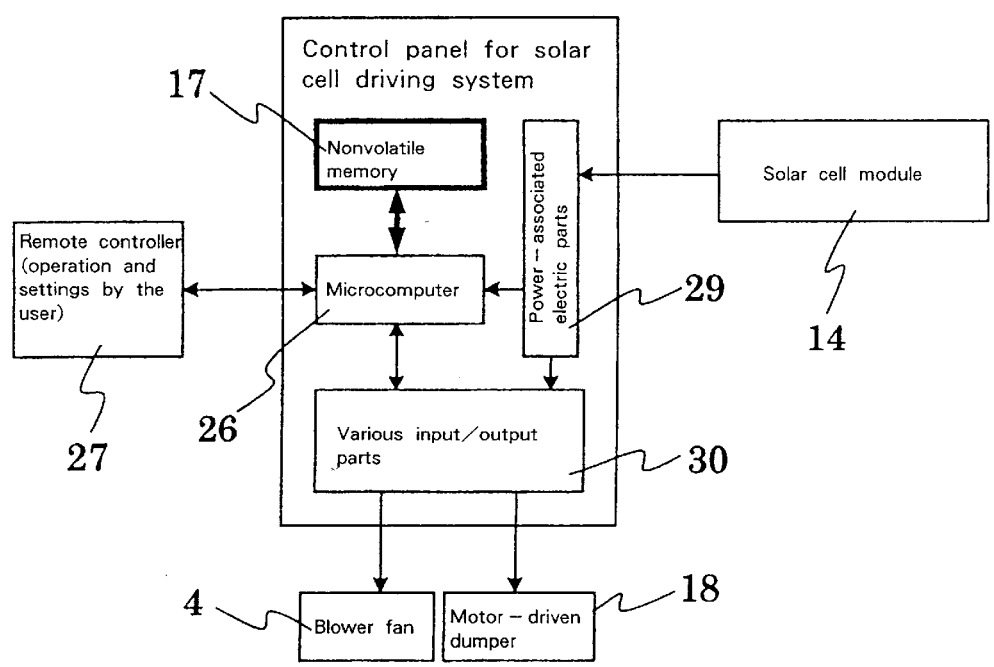
FIG. 8 is a block diagram for illustrating a control system of the air type solar system of the present invention.

An electrical control of the blowing fan 4 with the proportional control unit 15 is also illustrated in FIGS. 3 and 8. Briefly, the temperature sensor 16 senses the temperature of heat-collected air in the air passage 3 or the air duct 5 and sends signals to the microcomputer 26 where the degree of proportional control is determined from the difference between the temperature of the heat-collected air and the desired temperature for the control by a CPU in a main circuit for controlling the proportional control unit 15 by the microcomputer 26. Subsequently, such a difference is sent as a signal to an integrated circuit (IC) of a controller (PWM control) 23 of a fan-driving DC motor 4a of the blower fan 4.

The proportional control unit 15 is connected with a nonvolatile memory 17 such that it is configured to keep the contents of the setting of the proportional control unit 15, the contents of matters detected by the sensor 16, the status of the control being determined, and so on. In FIG. 8, by the way, the reference numeral 27 denotes a remote controller for allowing the user to make settings on the microcomputer 26 and 29 denotes power-associated electric parts, and 30 denotes various input/output parts.

Figure 5:
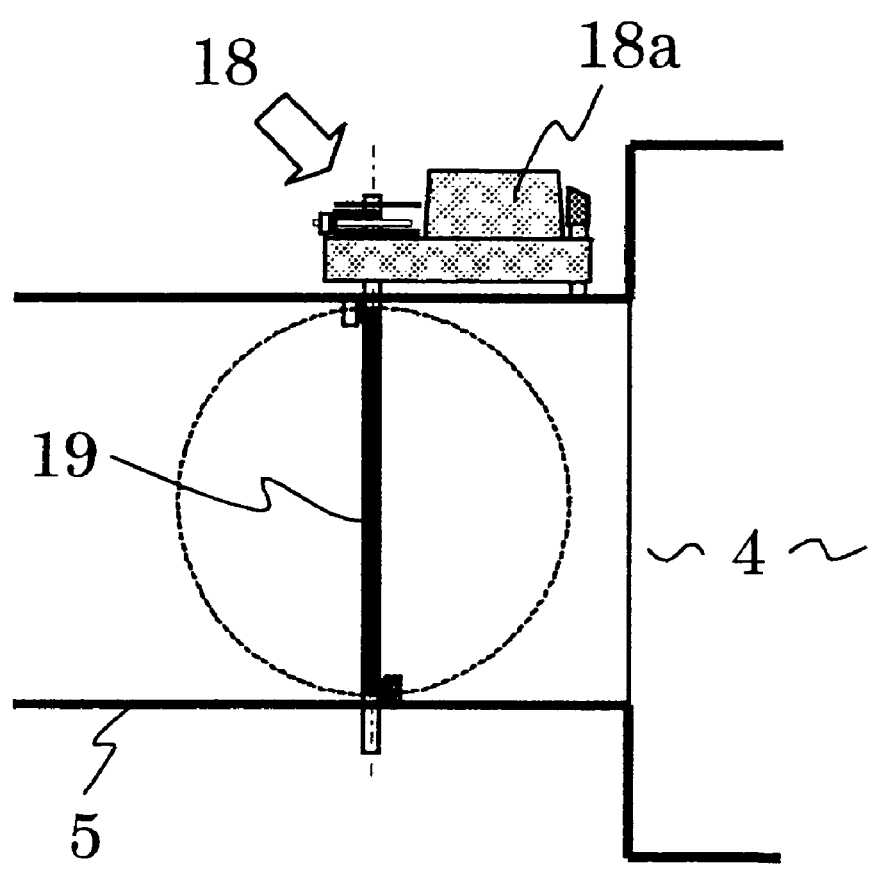
FIG. 5 is a schematic side view of a motor-driven damper to be used in the air type solar system of the present invention.

The motor-driven damper 18 is placed in the path over with the air flows from the blowing fan 4 and is responsible for preventing backflow of air to the fan 4 and adjusting the direction of air flow. As shown in FIG. 5, the motor-driven damper 18 is comprised of a damper motor 18a and an impeller body 19 to be rotated by the motor 18. The motor-driven damper 18 can be locked in a desired state by means of a gear-locking member or the like even after powering off the damper 18.

Figure 4:
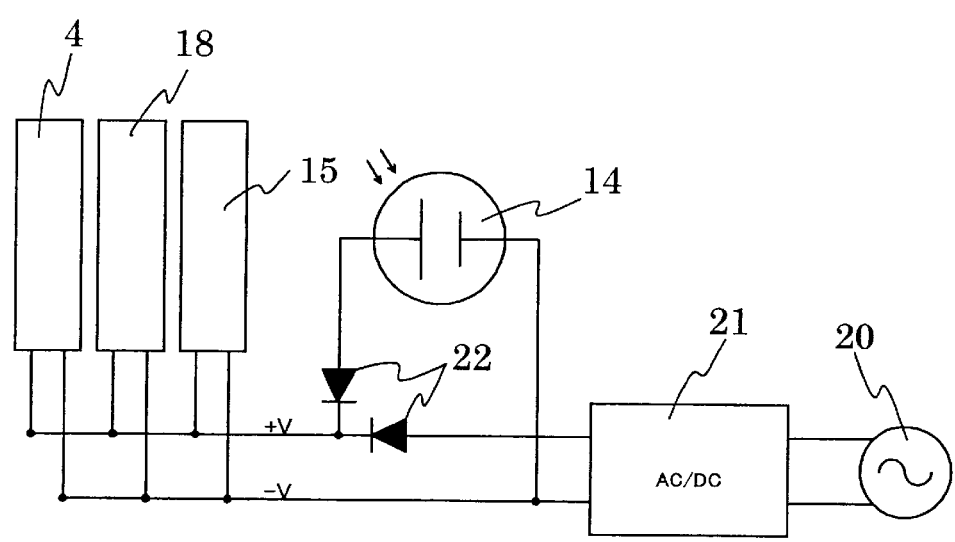
FIG. 4 is a circuit diagram of an electric power supply to be used in the air type solar system of the present invention.

The above solar cell module 14 is used as electric power sources of the blower fan 4 and the motor-driven damper 18 as described above. As shown in FIG. 4, the solar cell module 14 may be also used as a power source of the proportional control unit 15. Furthermore, AC/DC converter 21 connected with a commercial AC power source 20 may be used as an auxiliary power-supplying device to be connected with the solar cell module 14 in parallel. In this case, a rectifying device 22 such as a rectifier diode is arranged in the circuit for preventing backflow of power to adjust the auxiliary power-supplying device to a voltage lower than an operating voltage of the solar cell module 14 provided as the power source. Therefore, the solar cell module 14 is used in combination with the commercial AC power source 20 as a hybrid power source for the blower fan 4, the solar cell module 14 and the commercial AC source the motor-driven damper 16.

Now, the operation of the air type solar system will be described. In the case of the first embodiment shown in FIG. 1, the air (the outside air) is introduced from the air inlet 2 into the air passage 3 of the heat-collecting part 10 and is then heated by the metallic roof plate 11 being heated by solar heat, following by blowing the air as the current of warm air directly or indirectly into the target space 12 by the blower fan 4.

In the case of the second embodiment shown in FIG. 2, the metallic roof plate 11 being heated by solar heat heats the air, and then the blower fan 4 blows the air as the current of warm air directly or indirectly into the target space 13. Furthermore, the air in the target space 13 is recovered as the recovered air into the air passage 3 through the recovered air duct 24. Subsequently, the recovered air is heated again and is then transferred into the target space 13.

In both the first and second embodiments of the present invention, the amount of air supplied from the blower fan 4 is restricted by the electrical control and is then adjusted to a heat-collecting temperature appropriate to heating and humidification.

Figure 10:
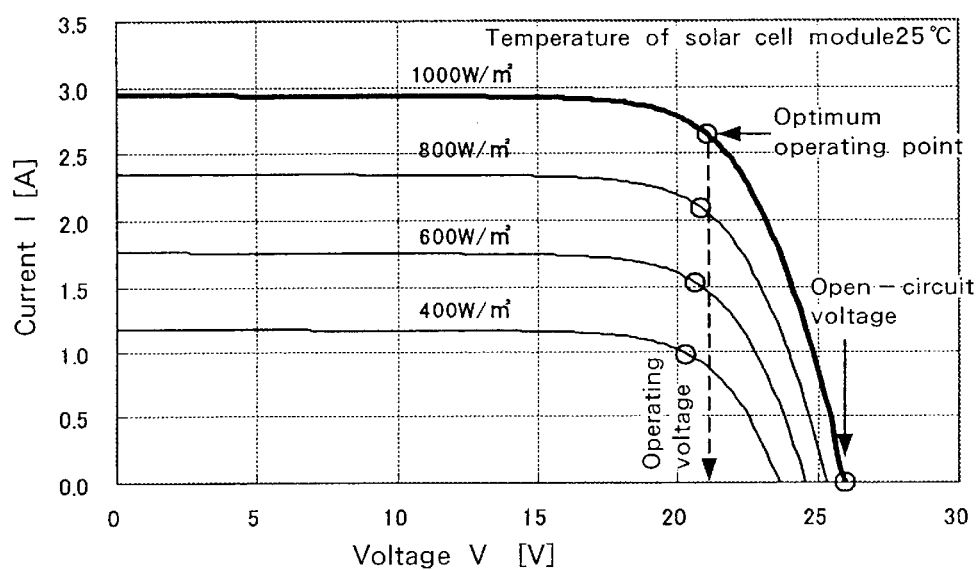
FIG. 10 is a graph that represents the solar radiation property of solar cell's electric power generation.

At first, the power-generating property of the solar cell module 14 with respect to the amount of solar radiation will be described. As shown in FIG. 10, when the solar cell module is at a temperature of 25° C. (i.e., at standard temperature), the power-generating property of the solar cell module is that the amount of current substantially varies in proportion to the amount of solar radiation while a change of voltage is comparatively small.

Figure 11:
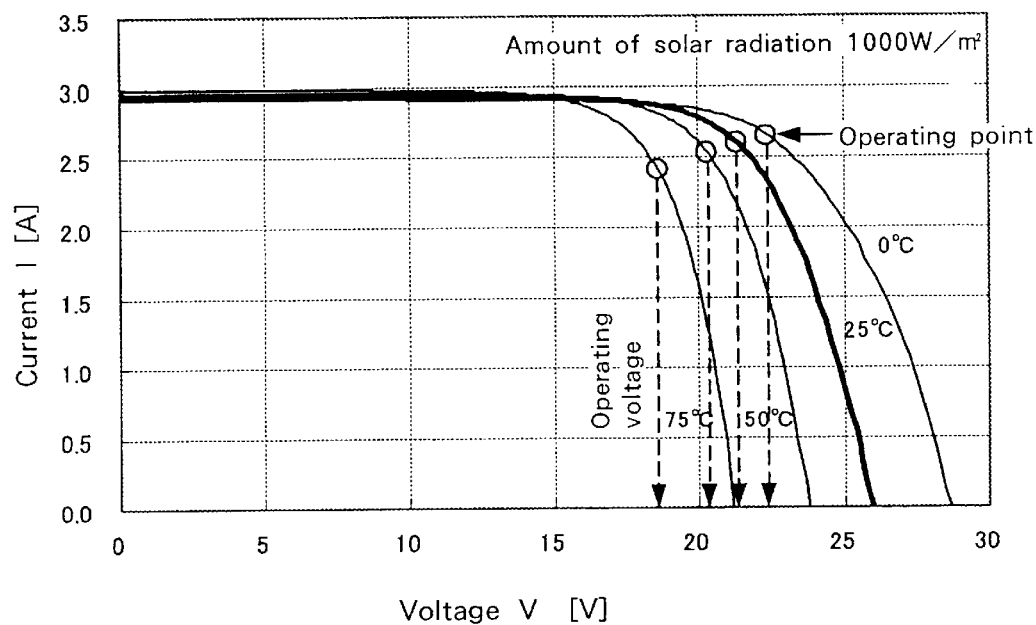
FIG. 11 is a graph that represents the temperature property of solar cell's electric power generation.

Next, the power-generating property of the solar cell module 14 with respect to the temperature thereof will be described. As shown in FIG. 11, the generated voltage decreases as the temperature of the solar cell module 14 increases. As shown in FIG. 11, furthermore, the voltage falls to about 85% that of the standard condition (25° C.) when the temperature of the solar cell module 14 is 75° C.

Figure 12:
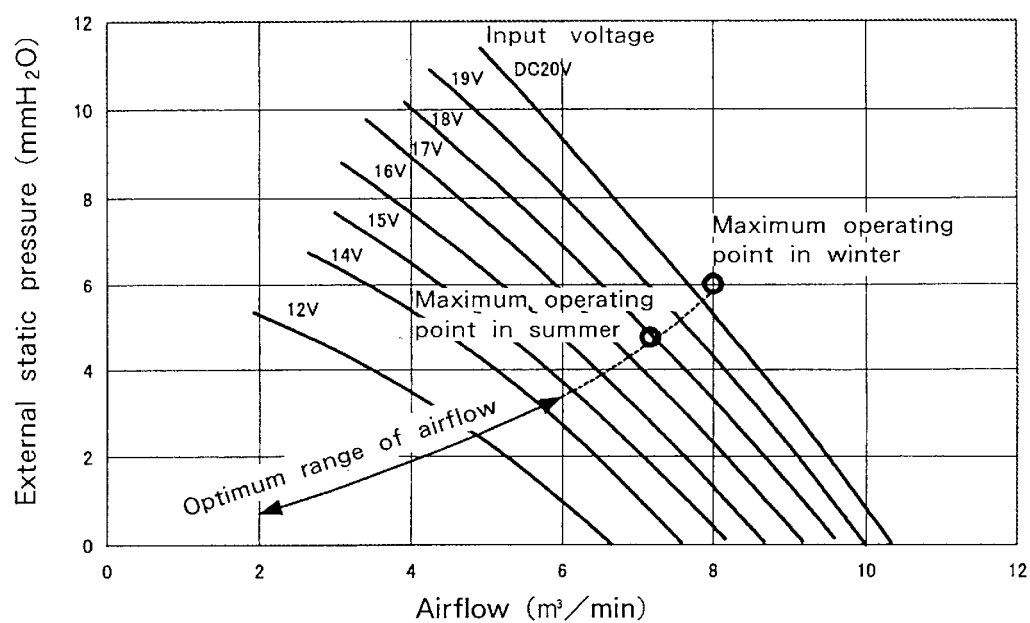
FIG. 12 is a graph that represents the air-volume property of a blower fan driven by solar cells in the air-type solar system of the present invention.

On the other hand, for example as shown in FIG. 12, the airflow property of the blower fan 4 driven by the solar cell module 14 is that the amount of air supplied from the blower fan 4 (in the figure, simply referred to as "airflow") is directly proportionate to the input voltage. The input voltage decreases when the temperature of the solar cell module 14 increases in summer, so the maximum amount of air supplied from the fan 4 (i.e., the maximum operating point of the fan 4) can be also decreased. In winter, the temperature of heat-collected air has a significant impact on the target space. Therefore, an appropriate amount of air supplied from the fan 4 is in the range defined by the maximum operating point in summer.

Figure 13:
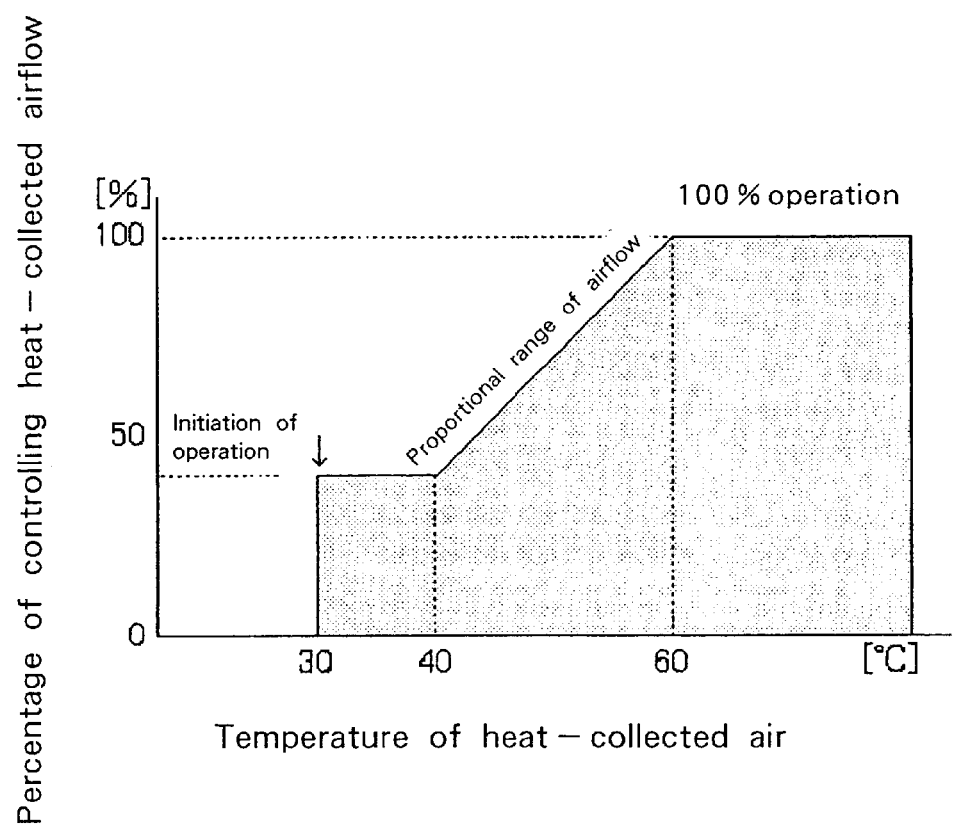
FIG. 13 is a graphical representation for illustrating the proportional control of the volume of air from a fan driven by the solar cells in the air type solar system of the present invention.
Figure 14:
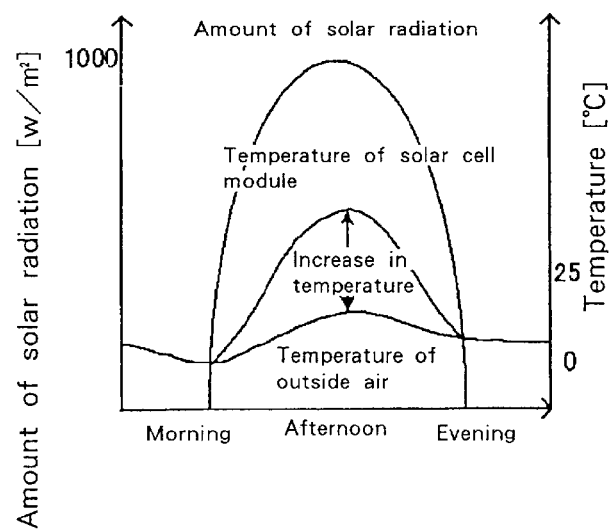
FIG. 14 is a graph that represents the relationship between the amount of solar radiation received and the temperature of the solar cell on a bright day in winter, while the fan driven by the solar cells is in operation.

Therefore, the amount of heat-collected air is adjusted in proportion to the temperature of the heat-collected air. As shown in FIG. 13, the heat-collecting operation is initiated when the temperature of heat-collected air is 30° C. or more. In addition, the amount of air increases in proportion to the increase in temperature within the range of 40 to 60° C. Furthermore, the amount of air is adjusted to 100% thereof when the temperature of the heat-collected air is 60° C. or more.

In general, the heat-collecting property of the heat-collecting surface of the solar cell module 14 is characterized in that the temperature of heat-collected air is hard to rise in winter because of the decrease in outside temperature and a low altitude of the sun. And the temperature of heat-collected air is easy to rise in summer because of increase in outside temperature and a high altitude of the sun. Therefore, the proportional control of the amount of airflow, which is described herein, is provided to confine the amount of airflow within narrow limits in winter to automatically raise the temperature of heat-collected air.

FIGS. 14 to 21 illustrate the operational statuses of the blower fan 4 driven by the solar cell module 14, respectively. In particular, these figures show the operational statuses of the fan driven by the solar cell module in winter and summer, which are typical weather conditions for one year.

Under clear skies in winter, the amount of solar radiation and the temperature of the solar cell module are characterized in that the temperature of the solar cell module does not become too high as the outside air temperature is low in winter and the difference between the amount of solar radiation in a typical fair weather pattern and that of the standard condition (25° C.) is small.

Figure 15:
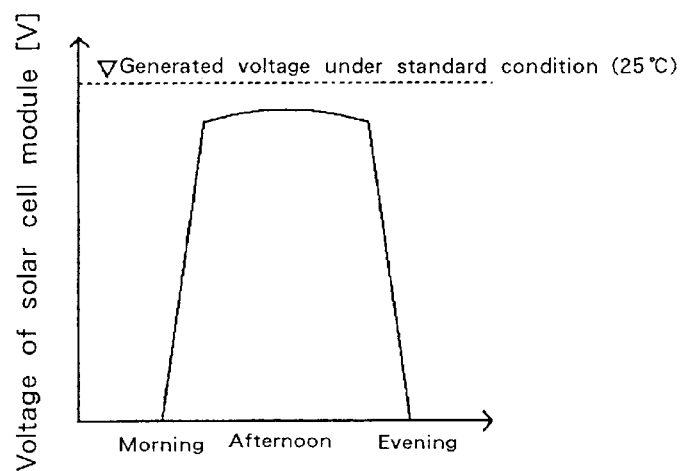
FIG. 15 is a graph that represents variations in voltage of the solar cell in winter, while the fan driven by the solar cells is in operation.
Figure 16:
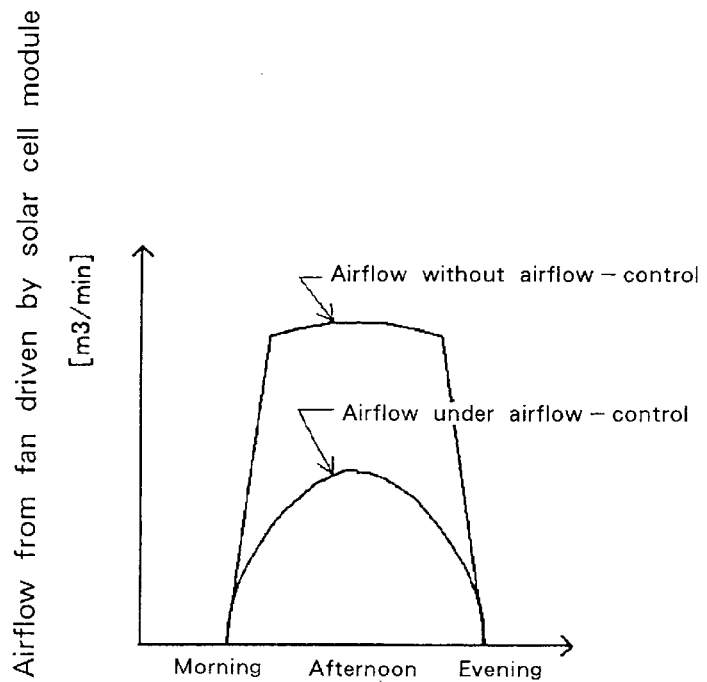
FIG. 16 is a graph that represents the relationship between the volume of air from the fan driven by the solar cells and the presence or absence of the control of the volume of air in winter, while the fan driven by the solar cells is in operation.

As shown in FIG. 15, the voltage of the solar cell module 14 in winter is analogous to that of the standard condition (25° C.), so that the generated voltage becomes analogous to a nominal generated voltage. In addition, the amount of airflow increases as shown in FIG. 16 when the amount of airflow is not controlled in winter. In other words, the operational status of the solar cell module 14 in winter permits more quantities of air supplied from the fan than that of the summertime. Furthermore, in the case of controlling the amount of air supplied from the fan, such a control is performed so as to confine the amount of airflow within narrow limits to prevent the temperature of heat-collected air to be excessively decreased.

Figure 17:
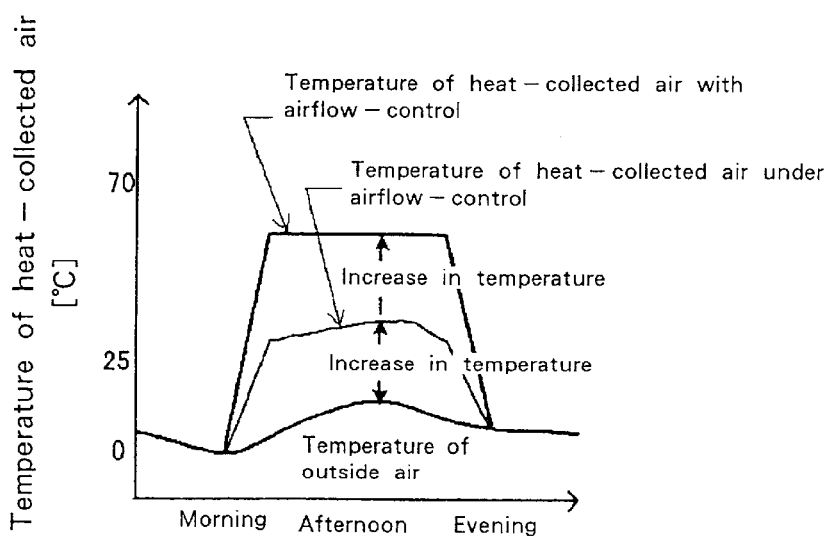
FIG. 17 is a graph that represents the relationship between the temperature of heat-collected air and the presence or absence of the control of the volume of air in winter, while the fan driven by the solar cells is in operation.

As shown in FIG. 17, the temperature of heat-collected air in winter without controlling the amount of airflow may cause excessive quantities of the airflow supplied from the fan, so that it becomes too low as the temperature of air for heating. In particular, in the case of a solar system in which the outside air is introduced as shown in FIG. 1, the temperature of the air taken in the air inlet is equal to the temperature of the outside air. Thus, the temperature of heat-collected air is lower than the desired temperature. Furthermore, the solar cell module is selected on the safe side in prospect of long-term deterioration of the solar cells and the system-associated devices. Therefore, the amount of air supplied from the fan becomes excessive when the solar cell module 14 is a new one, so that the temperature of heat-collected air can be further decreased. On the other hand, in the case of adjusting the temperature of heat-collected air while controlling the amount of airflow, the amount of air supplied from the fan is confined within narrow limits in proportion to the temperature of heat-collected air. Therefore, the temperature of heat-collected air can be controlled to a temperature suitable for heating purposes.

Figure 18:
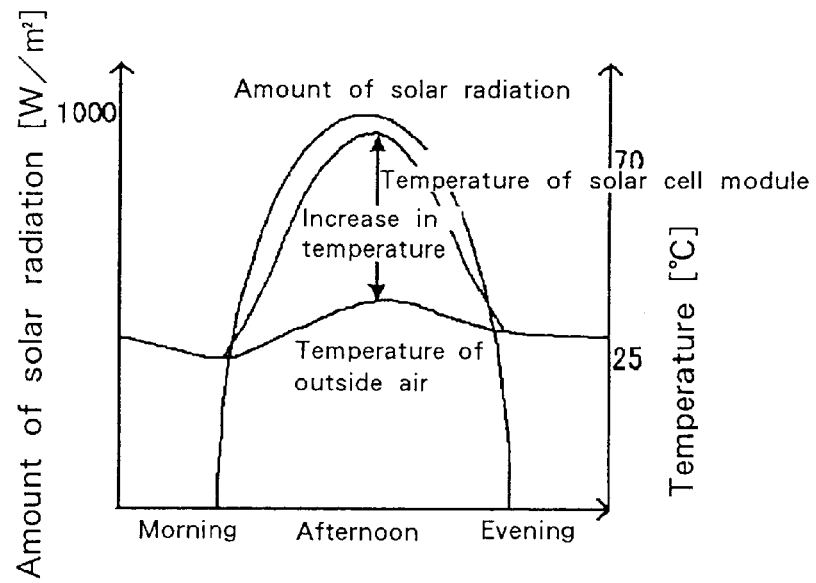
FIG. 18 is a graph that represents the relationship between the amount of solar radiation received and the temperature of the solar cell on a bright day in summer, while the fan driven by the solar cells is in operation.
Figure 19:
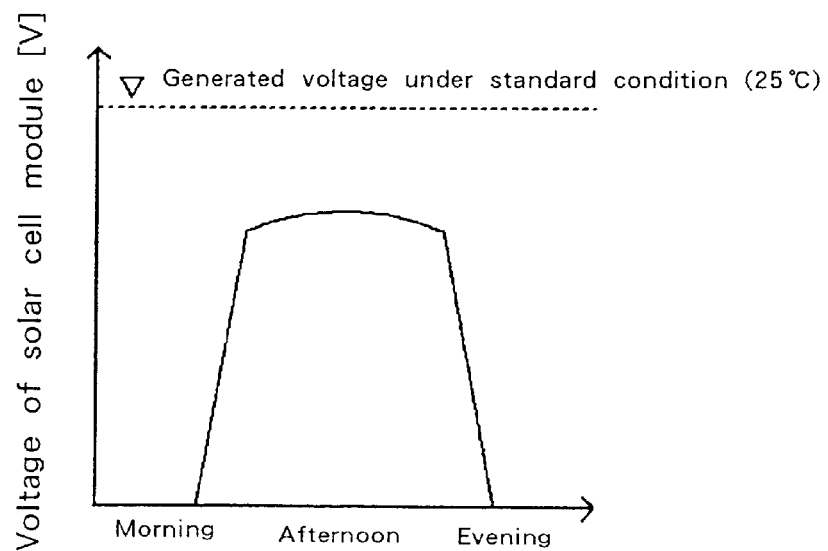
FIG. 19 is a graph that represents variations in voltage of the solar cell in summer, while the fan driven by the solar cells is in operation.

In summer, the temperature of outside air increases, so that the amount of solar radiation incident on the surface of the solar cell module at a typical angle of inclination thereof. Therefore, the temperature of the solar cell module is also raised. As shown in FIG. 18, the solar cell module reaches at a temperature of 70 to 80° C. In other words, the difference with the standard condition (25° C.) in summer is larger than the difference in winter. Regarding the voltage of the solar cell module 14 in summer, a maximum generated voltage becomes low as the temperature of the solar cell module 14 is raised to a large extent from the standard condition (25° C.).

As described above, in summer, a maximum mount of air supplied from the fan is smaller than one in winter as the temperature of the solar cell module 14 is high.

Figure 20:
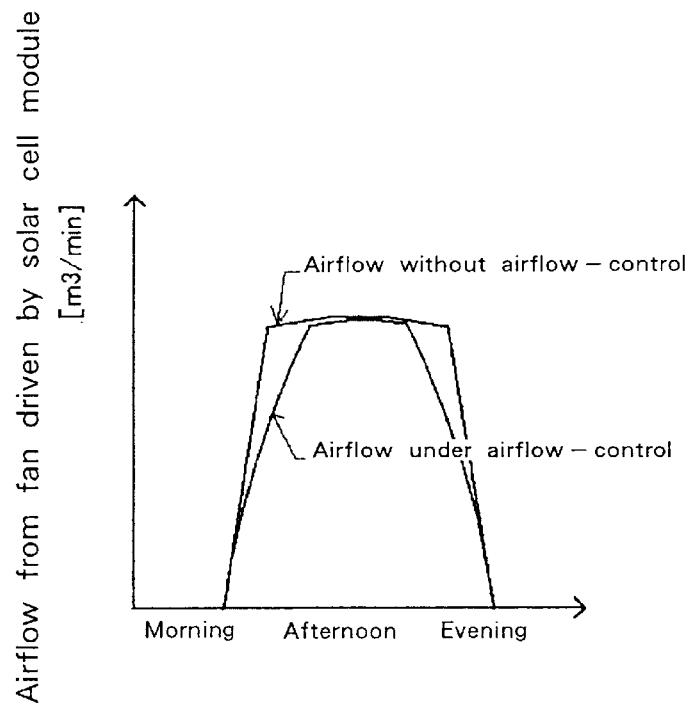
FIG. 20 is a graph that represents the relationship between the volume of air from the fan driven by the solar cells and the presence or absence of the control of the volume of air in summer, while the fan driven by the solar cells is in operation.

In general, a heat-collecting system driven by solar cells to be provided as a solar system is designed to fit to the use conditions, as the amount of air supplied from the fan becomes a maximum in summer. Therefore, as shown in FIG. 20, there is no substantial difference between the presence and the absence of the controls of airflow before and after the middle of the day. The amount of airflow in the presence of the control of such airflow is confined within narrow limits of one in the morning and in the evening, in which the temperature of heat-collected air is not raised to the maximum (i.e., 100% airflow).

Figure 21:
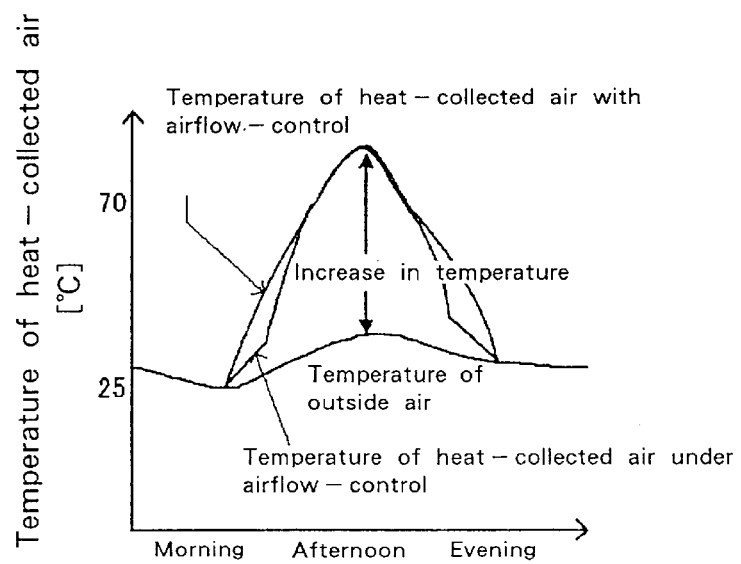
FIG. 21 is a graph that represents the relationship between the temperature of heat-collected air and the presence or absence of the control of the volume of air in summer, while the fan driven by the solar cells is in operation.

Observing the relationship between the temperature of heat-collected air and the presence or absence of such a control of airflow in summer, as shown in FIG. 21, the temperature of heat-collected air increases a little in the morning and evening at which the airflow control is confined within narrow limits. Therefore, for example, there is an advantage of increasing the amount of heat exchange for the purpose of hot-water supply.

The control of the amount of airflow from the blowing fan 4 driven by the solar cell module 14 as described above can be performed as follows. As shown in FIG. 3, the generated electric power of the solar cell module 14 is supplied to a direct current motor 4a via a controller 23 of the direct current motor 4a.

A temperature sensor 16 detects the temperature of heat-collected air. Then, a CPU in a main control circuit of a controller 23 generates an output signal to an IC of the DC motor controller 23, where the output signal corresponds to the degree of the control proportional to the amount of airflow obtained from the difference between the detected heat-collecting temperature and the temperature desired for the control. Depending on the degree of the signal inputted in the DC motor controller 23, the amount of airflow supplied from the fan is controlled proportionally by changing the actual voltage to the DC motor 4a by the control of PWM (pulse width modulation). The main control circuit receives repeatedly the feedback of the temperature of heat-collected air being changed with the controlled amount of airflow such that the amount of airflow is proportionally adjusted to the desired temperature.

Figure 22:
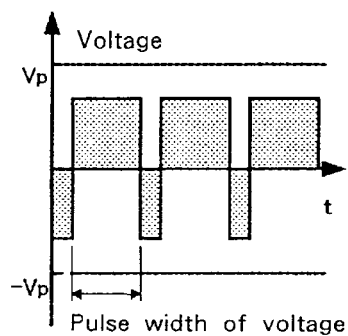
FIG. 22 is a waveform chart for illustrating the method of controlling the volume of air from the fan driven by the solar cells in the air type solar system of the present invention.
Figure 22:
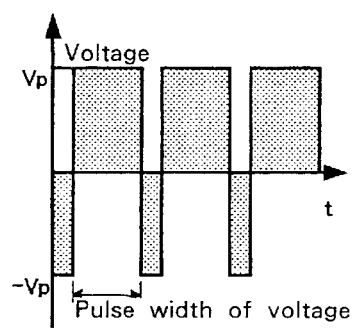
Figure 22:
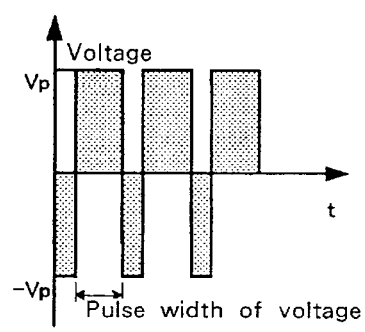

Referring now to FIG. 22, there is shown a waveform of a source voltage to the motor, which is generated as an output by the PWM control of the controller 23 of the DC motor 4a shown in FIG. 3.

In this figure, the graph (a) represents a waveform with a low height because of the decrease in the generated voltage while the temperature of the solar cell module is substantially apart from the standard condition (25° C.) in summer.

The graph (b) represents a waveform in which the generated voltage is almost in normal because the temperature of the solar cell module is closely analogous to the standard condition (25° C.) in winter, so that. In this case, furthermore, the solar cell module is selected under the conditions for the use in summer, so that the generated voltage is high and the amount of airflow becomes rather much.

The graph (c) represents a waveform in which the voltage pulse width is narrowed by the PWM control when the amount of airflow slightly larger than usual is confined within narrow limits in winter to decrease the actual voltage supplied to the DC motor 4a.

Consequently, according to the present invention, it becomes possible to exclude a storage cell even in a system that utilizes a solar cell that cannot receive the supply of electric power in the nighttime or in bad weather conditions.

In the followings, therefore, design ideas associated with the present invention will be described.

Figure 6:
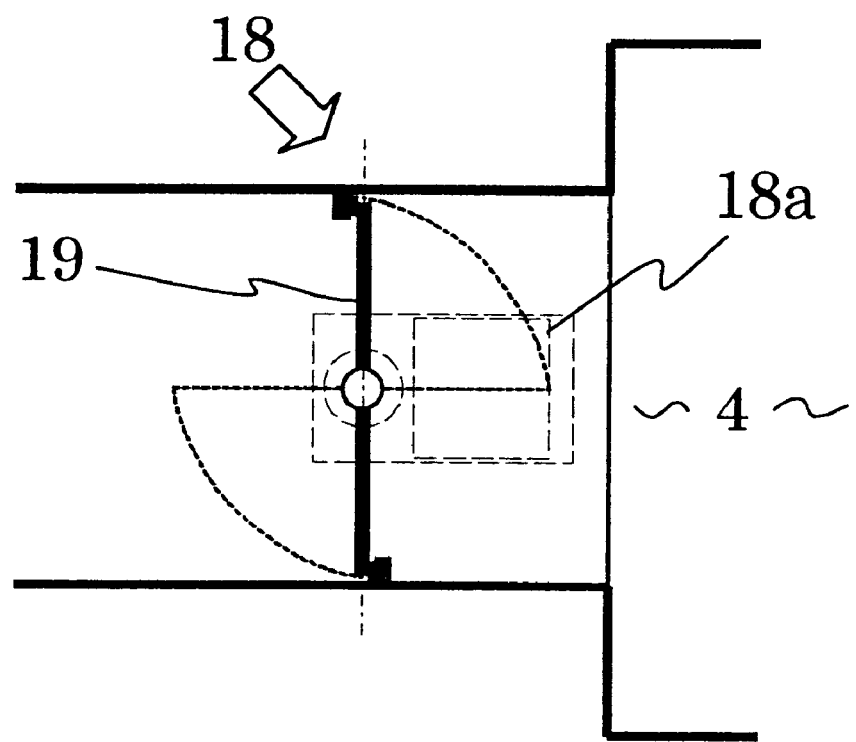
FIG. 6 is a bottom plan view of the motor-driven damper to be used in the air type solar system of the present invention in a state of being fixed.

A motor-driven damper 16 is attached on the vicinity of the blower fan 4. In other words, the motor-driven damper 16 is fixed in placed as shown in FIG. 6 to always energize a damper motor 18a and always to be subjected to motor torques such that the damper is fixed.

Figure 7:
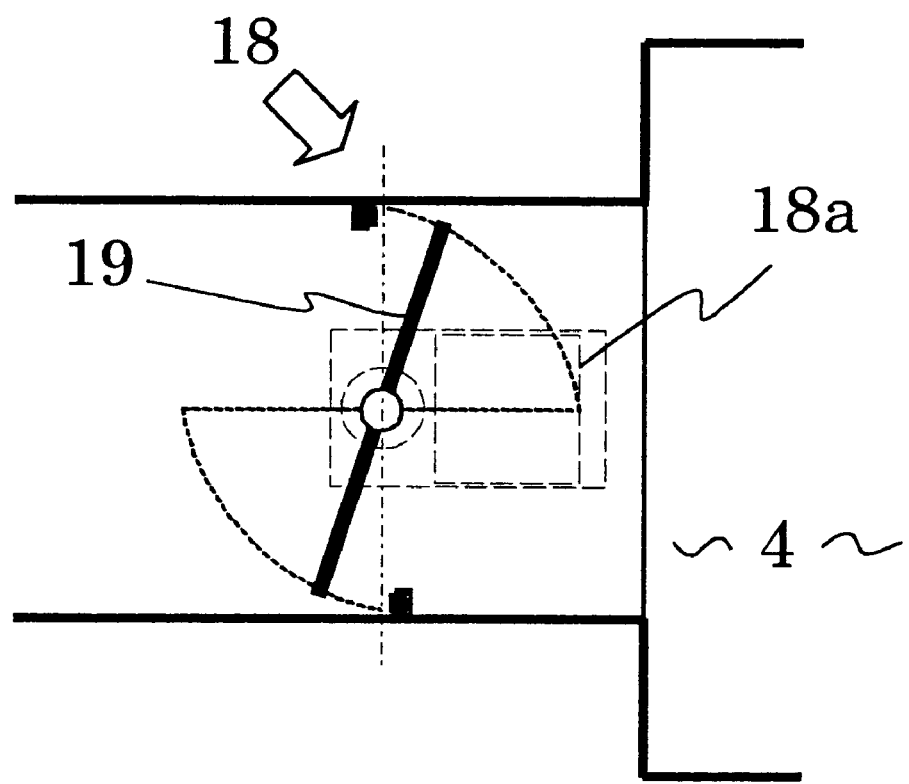
FIG. 7 is a bottom plan view of the motor-driven damper to be used in the air type solar system of the present invention in a state of being loosened.

In many cases where solar cells are used, storage cells are used in general to the passage of electric current through the damper even in the nighttime. In the case where any storage cell is not used, the damper is folded up as shown in FIG. 7 after powering off the damper motor having no gear-lock mechanism. As a result, warm air escapes from a room to the outside while cold air is introduced into the room from the outside. In this invention, removal of the storage cell from a solar system can be realized in combination with a dumper motor 18a having a gear-lock mechanism regardless of being actuated by solar cells.

Figure 9:
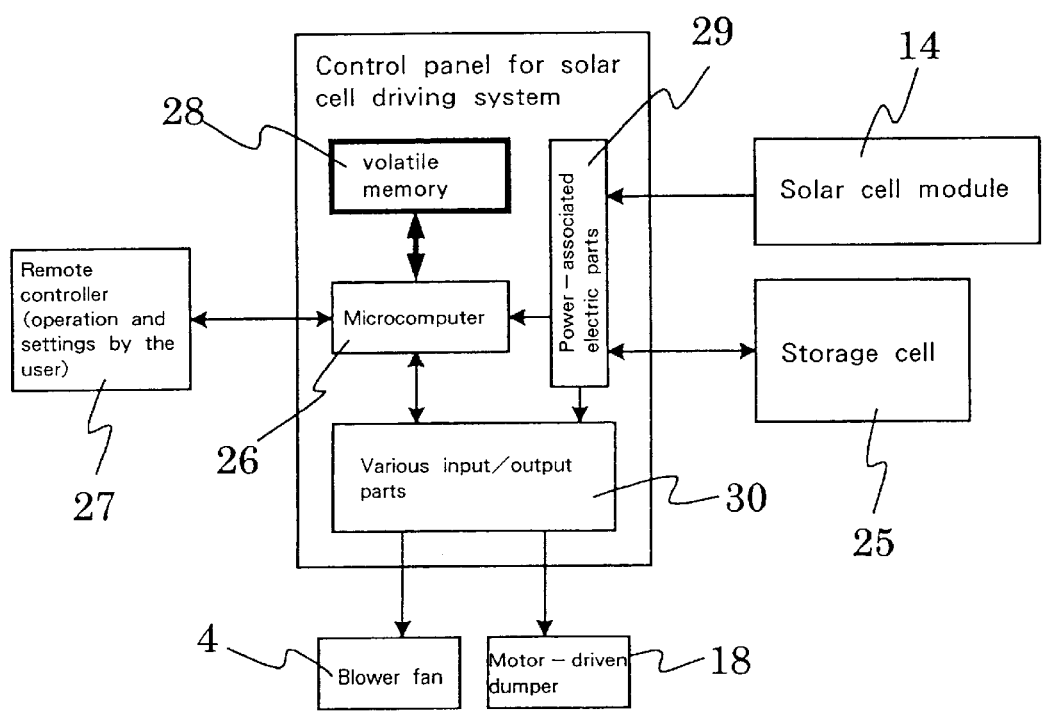
FIG. 9 is a block diagram for illustrating a control system of the air type solar system of the related art.

Furthermore, as shown in FIG. 8, removal of the storage cell from a solar system can be realized, even though the system uses solar cells which cannot supply electric power in the nighttime, by the use of a rewritable nonvolatile memory 17 as a storage into which, as described above, the contents of settings by the user through a remote controller 27, the contents of detection by a temperature sensor, the contents of judgment by the controller, history of failure, and so on are written as needed. As shown in FIG. 9, by the way, the conventional solar system uses a volatile memory 28. In addition, the conventional solar system, which cannot utilize its solar cell module in the nighttime, uses a storage cell for covering the electric power at the minimum all the time.

An auxiliary electric power source for the operation of the solar system that cannot generate electric power in the nighttime may have an electric power circuit simply comprised of a combination of a DC electric power unit and a diode that prevents backflow of power to the solar cell module to effectively utilize the electric power generated from solar cells.

In this embodiment, the regulated voltage of the auxiliary DC electric power unit is set to a voltage of 15 volts, which is slightly lower than an appropriate voltage for actuating a blower fan driven by the solar cell module. When the solar system is operated on a day with large amounts of solar radiation, electric power can be supplied from the solar cell module. On the other hand, the generated voltage decreases as the temperature of the solar cell module increases when the solar system is operated on a day with a small amount of solar radiation. In this case, as far as the release voltage exceeds about 15 volts, electric power generated from each of the solar cells can be effectively used in combination with each other. For example, from FIGS. 10 and 11, the released voltage becomes 20 volts or more. Therefore, the generated electric power can be effectively used while avoiding a waste thereof. Simultaneously, the auxiliary DC electric power unit can keep the minimum amount of the power-supply voltage.

Figure 23:
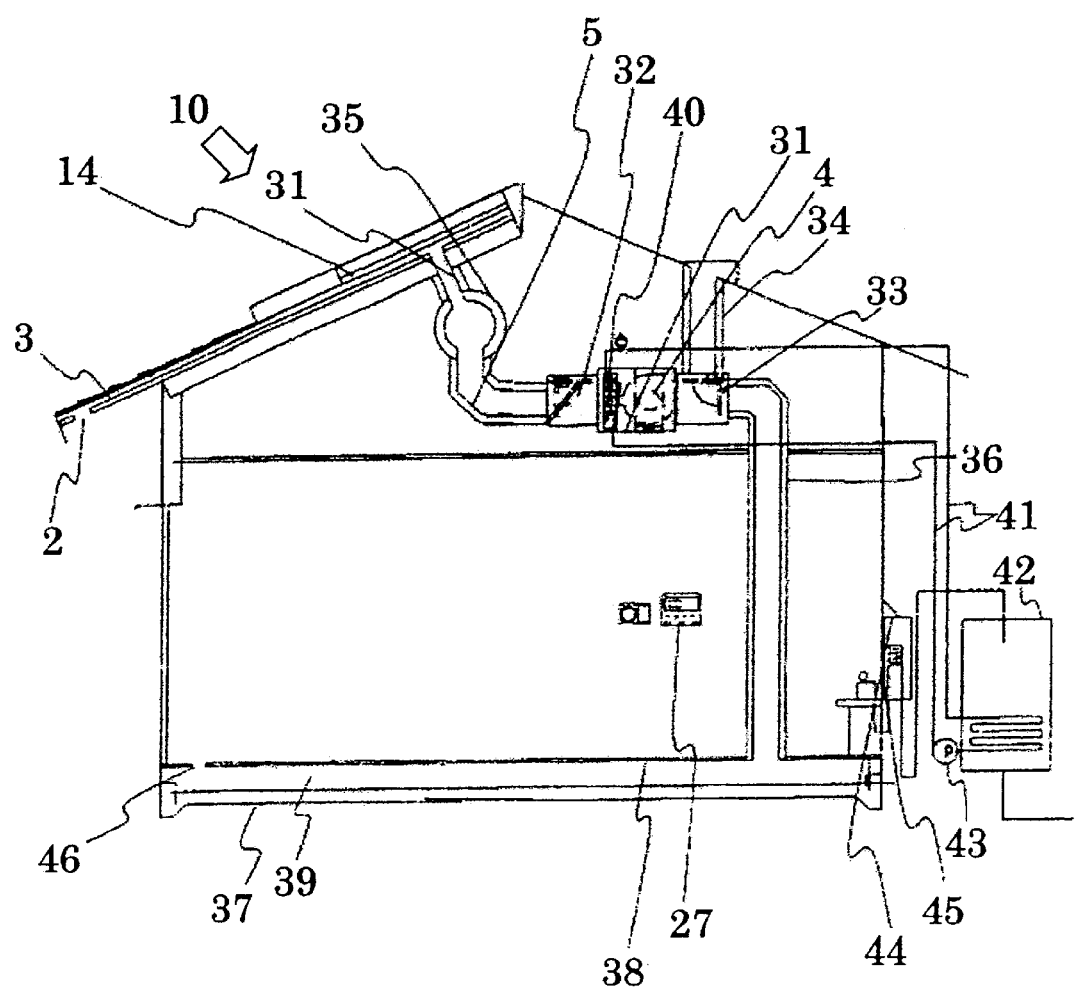
FIG. 23 is a schematic diagram for illustrating an example of a house with a built-in air-type solar system of the present invention.

Referring now to FIG. 23, there is shown a solar system in which an air-type solar system of the present invention is incorporated. As shown in the figure, a heat-collecting unit 10 forms an air passage 3 that extends along the slope of the roof directly below the metallic roof plate 1. In addition, the bottom side of the air passage 3 is insulated with a heat-insulating material. Furthermore, an air inlet 2 is formed in one end of the air passage 3, while an outlet is formed in the other end thereof being located at a position higher than the former. The outlet is connected with one end of an air duct 5, while the other end of the air duct 5 is connected with a handling box 31 via a ridge duct 35. Alternatively, the heat-collecting unit 10 for collecting solar heat may be mounted on a wall or the like when not installed on the roof.

In the handling box 31, a backflow-preventing damper 32, a blowing fan 4, and a passage-switching damper 33 are incorporated. The passage-switching damper 33 has two open ends on its outlet side, which extends in different directions. That is, one end on the outlet side of the passage-switching damper 33 of the handling box 31 is opened outside through an exhaust duct 34. In addition, the inlet side of the backflow-preventing damper 32 of the handling box 31 is communicated with the ridge duct 35 through the air duct 5.

The other end on the outlet side of the passage-switching damper 33 of the handling box 31 is connected with the upper end of a vertical duct 36. The lower end of the vertical duct 36 is opened into an air-flowing space 39 between an earth floor concrete 37 and a floorboard 38, which is provided as a heat-accumulating body below the floor.

A water-heating coil 40 is provided in the inside of the handling box 31 or between the handling box 31 and the ridge duct 35. The water-heating coil 40 is connected with a hot water storage tank 42 and a circulation pump 43 in a circulation pipe 41. In addition, the hot water storage tank 42 is connected with water-supply pipe 45 extending to a bath, a toilet, and a kitchen, while a water-supply boiler 44 is provided in the middle of the pipe 45 for bring the water to a boil.

For instance, the solar cells may be provided as a solar cell module 14 placed on the roof (i.e., on the heat-collecting unit 10 for collecting solar heat).

Therefore, the outside air introduced into the air passage 3 is heated by the roof plate 1 which is a metallic plate being heated by solar radiation, and then the heated air moves up along the slope of the roof. Subsequently, the heated air is collected into the ridge duct 36 and is then introduced into the handling box 31 through the blower fan 4. Then, the air moves down along the vertical duct 36 and flows into the air-flowing space 39 between the heat-accumulating earth-floor concrete 37 and the floorboard 38.

In the air-flowing space 39, the heated air may perform three heating actions of: directly warming up the floor through the floorboard 38; being accumulated in the above concrete 37; and being provided as warm air directly blowing out of an outlet 46 in the floor to warm up the inside of a room.

On the other hand, the water-heating coil 40 heats up a heat medium fed from the hot-water storage tank 42 through the circulation pump 43. The heated medium, which is hot water, is then stored in the hot-water storage tank 42. Furthermore, the hot water is fed to each of places through the water-supply pipe 45 after heating up the water again by the water-supply boiler 44 if required.

By the way, another heat-accumulating body may be formed in addition to the above concrete 37.

Figure 24:
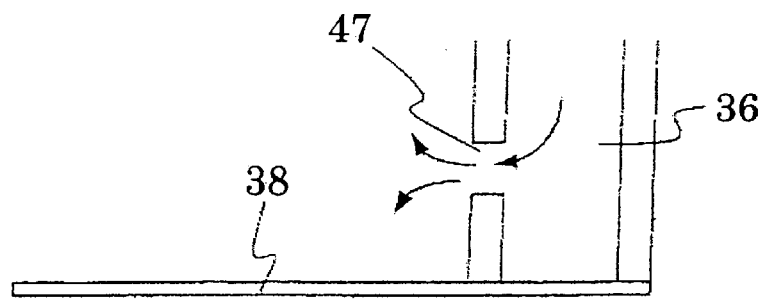
FIG. 24 is a schematic diagram for illustrating part of the floor of another example of the house with the built-in air-type solar system of the present invention.

In FIG. 23, the lower end of the vertical duct 36 is opened into the air-flowing space 39 below the floor. As shown in FIG. 24, alternatively, the vertical duct 36 may have an opening 47 formed in the lower end thereof to directly open into the inside of the room.

As described above, the system having the outlet 46 opened from the air-flowing space 39 below the floor into the inside of the room is suitable for "low-temperature panel heating". That is, warm air passes through the space below the floor to warm up a wide area of the floor the air of a comparatively low temperature, and the radiant heat is used to heat the inside of the room without excessively increasing the temperature of the air in the room. The typical "warm-air heating" is of intermittently heating one room only, so that it is forced to cause the temperature difference between the upper and lower spaces in the room. In contrast, the "low-temperature panel heating" does not cause such a temperature difference between the upper and lower spaces in the room and unpleasant blowing air. In addition, the "low-temperature panel heating" warms up from the user's feet by conductive heat through the floor, so that a comfortable interior of the room with "keeping the head cool and the feet warm" can be attained.

Furthermore, as shown in FIG. 24, in the case of directly opening the lower end of the vertical-duct 36 into the room, the roof collects solar heat. Then, the heat incorporated into the medium (i.e., the air) is directly radiated into the room, so that it becomes possible to intermittently warm up only a specific room in a short time.

Figure 25:
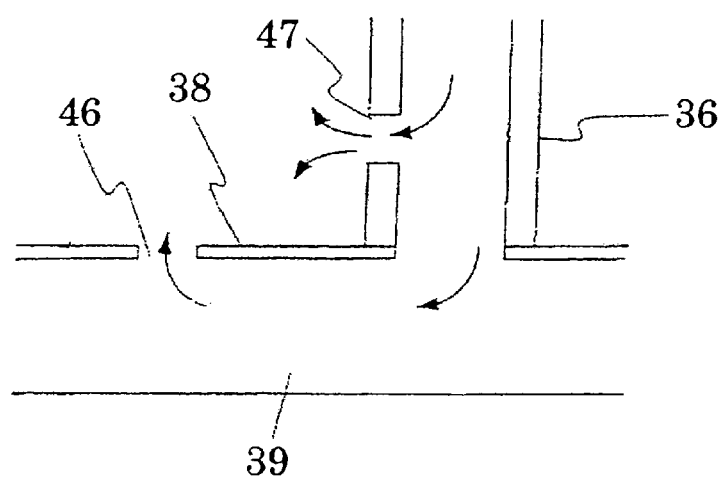
FIG. 25 is a schematic diagram for illustrating part of the floor of still another example of the house with the built-in air-type solar system of the present invention.
Figure 26:
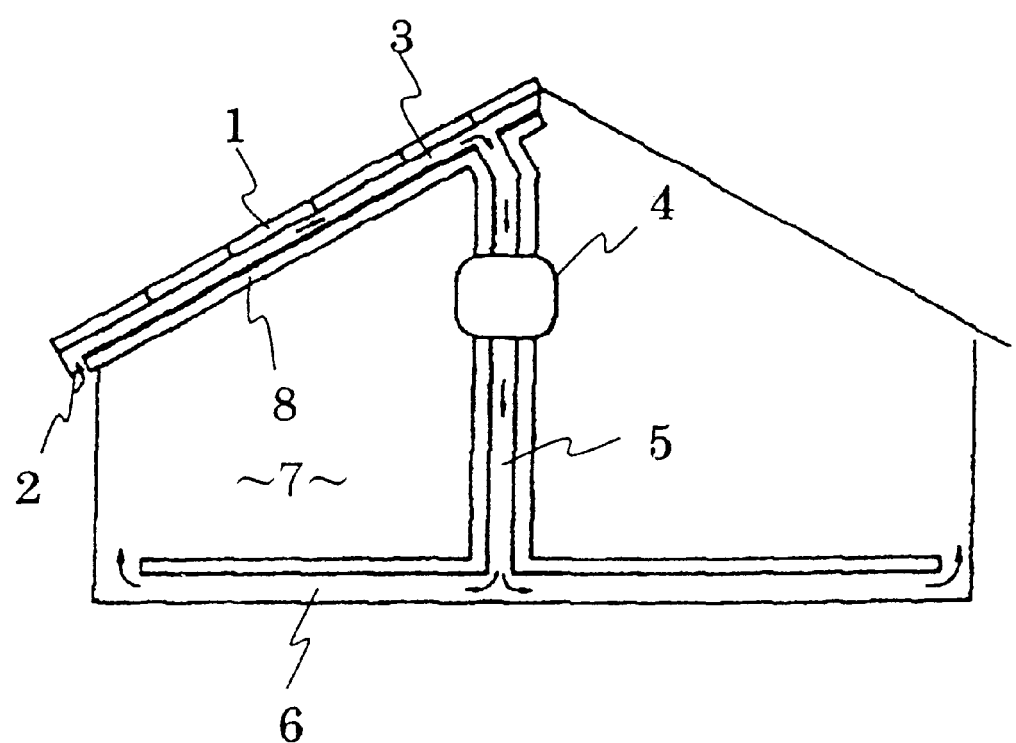
FIG. 26 is a schematic diagram of a house with a built-in solar system as an example of the related art.

By the way, as shown in FIG. 25, in the case of opening the lower end of the vertical duct 36 into the air-flowing space 39 below the floor, it is possible to use it together with the opening directly opened into the room.

In such a solar system house, there is the need for releasing the heated air being heated at the room plate 1 entirely to the outside when there is no need to heat up the room because of a high room temperature in summer or the like. In this case, the passage-switching damper 33 closes the outlet of the handling box 24 toward the vertical duct 36 and opens the other outlet thereof toward the exhaust duct 34. Therefore, the heated air from the handling box 31 can be released outside through the exhaust duct 34. By the way, as the heated air passes through the handling box 31, the water-heating coil 40 is allowed to heat up water. Therefore, it is possible to obtain hot water by the use of solar heat even on a hot day in summer or the like.

Furthermore, the blowing fan 4 may be worked during the night in summer to uptake cool air in the night into the air passage 3 directly below the metallic roof plate 1, while allowing the air to be subjected to radiation cooling from the surface of the roof. Then, the air is fed into the air-flowing space between the underfloor heat-accumulating body below the floor and the floorboard 38 via the vertical duct 36. Therefore, the cool air also allows the concrete 37 provided as an underfloor heat-accumulating body to be cooled off.

As described above, the air type solar system of the present invention uses the electric power generated by solar cells as an electric power supply to increase the dependency on natural energy that can be recycled. Therefore, the air type solar system of the present invention has an advantage of ensuring the minimum heating conditions by its self-sustaining at a distant location, or in the event of a power failure or disaster, so that it can be useful to keep the safety of life and property from dangerous matters and deficiencies.

Furthermore, the air type solar system of the present invention is also allowed to give consideration to avoid the use of a storage cell and to be appropriately adjusted and operated such that the blower fan, which mainly use the power supply generated from the solar cells can be operated so as to prevent a substantial increase in heat-collecting temperature in summer while obtaining the desired heat-collecting temperature in winter.

What is claimed is:

1. An air type solar system, comprising:
   a heat-collecting unit for heating air by solar heat; and
   a blower fan for blowing the air as a heat medium from the heat-collecting unit, wherein the blower fan is of a large scale, which is capable of; blowing the air at a rate of about 100 to 2000 m$^3$/hour; and further comprising:
   solar cell means for supplying electrical power to drive said blower fan;
   a sensor means for detecting a temperature of heat-collected air;
   a proportional control means coupled to said sensor means and to said blower fan for automatically controlling electrical power to said blower fan in response to a difference between said temperature of said heat-collected air and a target temperature of a target space such that an amount of airflow through said heat-collecting unit and into said target space is automatically controlled to adjust the temperature of the heat-collected air supplied to said target space to said target temperature; whereby said amount of airflow of said blower fan which tends to excessively increase in winter due to lower temperatures of the solar cell means is reduced.

2. An air type solar system as claimed in claim 1, wherein a damper is placed in an air passage through which the air is supplied from The blower fan, where the damper can be fixed in a predetermined state by a gear lock or the like even after powering off.

3. An air type solar system as claimed in claim 1, wherein the proportional control means includes a nonvolatile memory that keeps the contents, the contents of matters detected by the temperature sensor, and the determining status of the control.

4. An air type solar system as claimed in claim 1, wherein the solar cell means is connected with an auxiliary power-supplying device via a rectifying devices, where the auxiliary power-supplying device is adjusted to a voltage lower than an appropriate opting voltage thereof to be obtained by providing the solar cell means as the power-supplying device, and
   a combination of the solar cell means and the auxiliary power-supplying device is used as power-supplying device for said blower fan.

5. An air type solar system as claimed in claim 1, wherein the heat-collecting unit for heating air by solar heat is mounted on a root, a wall, or the like, and is communicated with a heat-collecting duct, while the heat-collecting duct is connected with a backflow-preventing dumper for preventing backflow of air to the heat-collecting duct, a passage-switching dumper for switching between an airflow to a vertical dumper for flowing the air into a room an airflow to an exhaust duct for exhausting the air outside, and a handling box having a blower fan arranged between the backflow-preventing damper and the passage-switching damper, and the output side of the handling box is connected with the vertical duct for flowing the air into the room and the exhaust duct for exhausting the air outside.

* * * * *